(12) United States Patent
Bernard et al.

(10) Patent No.: US 10,404,719 B2
(45) Date of Patent: Sep. 3, 2019

(54) DATA VERIFICATION METHOD

(71) Applicants: IDEMIA IDENTITY & SECURITY FRANCE, Issy les Moulineaux (FR); STARCHIP, Meyreuil (FR)

(72) Inventors: Jean-Yves Bernard, Meyreuil (FR); Yves Fusella, Meyreuil (FR); Maël Berthier, Issy les Moulineaux (FR); Lauren Del Giudice, Issy les Moulineaux (FR)

(73) Assignees: IDEMIA IDENTITY & SECURITY FRANCE, Issy les Moulineaux (FR); STARCHIP, Meyreuil (FR)

( * ) Notice: Subject to any disclaimer, the term of this patent is extended or adjusted under 35 U.S.C. 154(b) by 0 days.

(21) Appl. No.: 15/819,637

(22) Filed: Nov. 21, 2017

(65) Prior Publication Data

US 2018/0145992 A1 May 24, 2018

(30) Foreign Application Priority Data

Nov. 23, 2016 (FR) .................................... 16 61389

(51) Int. Cl.
*H04L 29/06* (2006.01)
*H04L 9/32* (2006.01)
(Continued)

(52) U.S. Cl.
CPC ........ *H04L 63/126* (2013.01); *G06F 12/1408* (2013.01); *G06F 21/554* (2013.01);
(Continued)

(58) Field of Classification Search
None
See application file for complete search history.

(56) References Cited

U.S. PATENT DOCUMENTS

| 6,381,696 | B1 * | 4/2002 | Doyle | G06F 21/64 |
| | | | | 713/156 |
| 2005/0159885 | A1 * | 7/2005 | Nomura | G01C 21/32 |
| | | | | 701/453 |
| 2014/0006798 | A1 * | 1/2014 | Prakash | G06F 21/6218 |
| | | | | 713/189 |

FOREIGN PATENT DOCUMENTS

| WO | 00/19299 A1 | 4/2000 | |
| WO | 2016/014919 A1 | 1/2016 | |
| WO | WO2016014919 | * 1/2016 | ............. G06F 21/64 |

OTHER PUBLICATIONS

Jun. 29, 2017 Seach Report issued in French Patent Application No. 1661389.

* cited by examiner

*Primary Examiner* — Yogesh Paliwal
*Assistant Examiner* — Hassan Saadoun
(74) *Attorney, Agent, or Firm* — Oliff PLC

(57) ABSTRACT

Method for verifying data generated by an electronic device included in equipment, the electronic device including a computing unit, a one-time programmable memory and a volatile memory, the equipment including a rewritable non-volatile memory and a communication bus enabling the electronic device to store data in the rewritable non-volatile memory. The method includes: creating a secured channel by encryption between the equipment and a server; obtaining an authentication key from the server; loading data and a message authentication code from the rewritable non-volatile memory to the volatile memory, the message authentication code obtained by the electronic device from the authentication key and said data prior to the storage of said data and message authentication code in the rewritable non-volatile memory, the electronic device not having kept the authentication key following the obtaining of the mes- (Continued)

sage authentication code; verifying said data using the secret key and the message authentication code.

12 Claims, 3 Drawing Sheets

(51) Int. Cl.
*G06F 12/14* (2006.01)
*G06F 21/55* (2013.01)
*G06F 21/64* (2013.01)
*G06F 21/71* (2013.01)
*G06F 21/72* (2013.01)
*G06F 21/77* (2013.01)

(52) U.S. Cl.
CPC .............. *G06F 21/64* (2013.01); *G06F 21/71* (2013.01); *G06F 21/72* (2013.01); *G06F 21/77* (2013.01); *H04L 9/3226* (2013.01); *H04L 9/3242* (2013.01); *H04L 63/18* (2013.01); *G06F 2221/2105* (2013.01); *H04L 67/42* (2013.01)

DATA VERIFICATION METHOD

The invention relates to a method for verifying data generated by an electronic device included in equipment suitable for communicating with a server via a communication network, and a device and system able to implement said method.

More and more electronic devices have become communicating, either because they have themselves communication capabilities or because they are connected to or integrated in other communicating electronic devices or equipment. In some cases, these electronic devices store and sometimes exchange sensitive and confidential data, which are necessary to protect. The integrity and authenticity of these data must also be guaranteed. This is because more and more electronic devices (chip cards, smartphones, computers, connected objects, etc.) must deal with hardware or software attacks. Protection means, both software and hardware, have been developed to deal with such attacks. These means comprise encryption means making it possible in particular to protect data exchanges and protected hardware architectures making it possible to protect data or programs stored in memory in an electronic device.

Attacks intended to recover confidential data, or to attack the integrity or authenticity (including the replaying) of these data generally take advantage of faults in electronic devices. For example, for reasons of security, some electronic devices comprise components integrating both a computing unit (i.e. a microprocessor, a microcontroller, etc.) and at least one memory (generally a flash memory) intended for this computing unit. In the case of advanced technologies, for reasons of cost and technical problems related to coexistence between a computing unit and a memory on the same component, memories (of the flash type) integrated on these components cannot be envisaged. Only certain types of non-rewritable non-volatile memories can be integrated.

These components must then use external memories for their functioning. A communication bus is then created between the computing unit of the component and the external memory. This communication bus may constitute a security failing since it opens the door to sensitive data managed by the electronic device. This failing is all the greater when this external memory is shared by other electronic devices. This is because it is generally considered that it is easy for an attacker to examine data and data addresses placed on a bus. One solution generally applied consists of encrypting the data transmitted over a bus. However, it is known that encryption is not sufficiently effective in the case of certain attacks such as identity theft attacks "spoofing attacks", relocation attacks and replay attacks.

A spoofing attack consists of supplying random data on the bus in order to cause malfunctioning of the electronic device.

A relocation attack occurs when an instruction placed on the bus by an attacker is copied from a different address.

A replay attack occurs when a data transmission is fraudulently repeated. This attack is implemented by an attacker intercepting the data. The attacker is then in a position to re-present these data later and to take advantage of them (reauthenticating himself, restoring previous data).

It is desirable to overcome these drawbacks of the prior art. It is in particular desirable to propose a method and device for preventing replay attacks.

According to a first aspect of the invention, the invention relates to a method for verifying data generated by an electronic device included in equipment suitable for communicating with a server via a communication network, the electronic device comprising a computing unit, a non-volatile one-time programmable memory and a volatile memory, the equipment comprising a rewritable non-volatile memory and a communication bus enabling the electronic device to store data in the rewritable non-volatile memory. The method is implemented by the electronic device and comprises: creating a secured channel by encryption between the equipment and the server; obtaining a message authentication code key, referred to as an authentication key, from the server; loading data to be verified and a message authentication code corresponding to said data from the rewritable non-volatile memory to the volatile memory, the message authentication code having been obtained by the electronic device from the authentication key and said data prior to the storage of said data and message authentication code in the rewritable non-volatile memory, the electronic device having had available the authentication key only at the time of the generation of the message authentication code; verifying the data to be verified using the secret key and the message authentication code and using the data when the verification is positive.

Thus no data stored in the rewritable non-volatile memory can be used if it has not been verified positively by means of the authentication key and the message authentication code, which limits the possibilities of replay attack.

According to one embodiment, the data to be verified and the message authentication code have been encrypted using a first encryption key stored in the one-time programmable memory prior to storage thereof in the rewritable non-volatile memory and are deciphered following loading thereof in the volatile memory and prior to verification thereof.

Thus each data transfer between the rewritable non-volatile memory and the electronic device by means of the communication bus is protected.

According to one embodiment, the data to be verified are used only when the secured channel between the equipment and the server can be created.

According to one embodiment, the encryption used for creating the secured channel uses a second encryption key stored in the one-time programmable memory.

According to one embodiment, the authentication key is obtained by the electronic device following transmission by the electronic device of a request to obtain said authentication key at the server.

According to one embodiment, the authentication key was previously generated by the electronic device and transmitted to the server.

According to one embodiment, the authentication key was previously generated by the server and transmitted to the electronic device for generating the security information.

According to one embodiment, a different new authentication key is generated whenever data are stored by the electronic device in the rewritable non-volatile memory or at predefined regular time intervals or following a predefined number of storages of data in the rewritable non-volatile memory or at randomly determined instants.

The use of a different authentication key or one changing regularly for generating the message authentication code when data are stored by the electronic device in the rewritable non-volatile memory prevents replay attacks. An attacker succeeding in copying data stored in the rewritable non-volatile memory by the electronic device could not use them in a context of a replay attack. This is because the message authentication code associated with these data in the rewritable non-volatile memory will have little chance of corresponding to the message authentication code that it will generate by means of the authentication key transmitted by the server. Verification of the data would then be negative.

According to a second aspect of the invention, the invention relates to an electronic device comprising means for implementing the method according to the first aspect.

According to a third aspect of the present invention, the invention relates to equipment able to communicate with a server via a communication network comprising a rewritable non-volatile memory and an electronic device according to the second aspect.

According to a fourth aspect of the present invention, the invention relates to a system comprising a server and equipment according to the third aspect, the equipment being suitable for communicating with the server via a communication network.

According to a fifth aspect of the present invention, the invention relates to a computer program, comprising instructions for the implementation, by a device, of the method according to the first aspect, when said program is executed by a computing unit of said device.

According to a sixth aspect of the present invention, the invention relates to storage means storing a computer program containing instructions for the implementation, by a device, of the method according to the first aspect, when said program is executed by a computing unit of said device.

The features of the invention mentioned above, as well as others, will emerge more clearly from a reading of the following description of an example embodiment, said description being given in relation to the accompanying drawings, among which:

The following description details more particularly an embodiment of the present invention in a context of a smartphone in which an electronic device of the SIM (subscriber identity module) card type is inserted. The principles described here do however apply to all types of equipment connected to a remote server able to integrate at least temporarily an electronic device manipulating confidential data, said device having to rely on an external memory for functioning. The principles of the invention apply for example to a chip-card reader or to a connected object.

Figure 1:
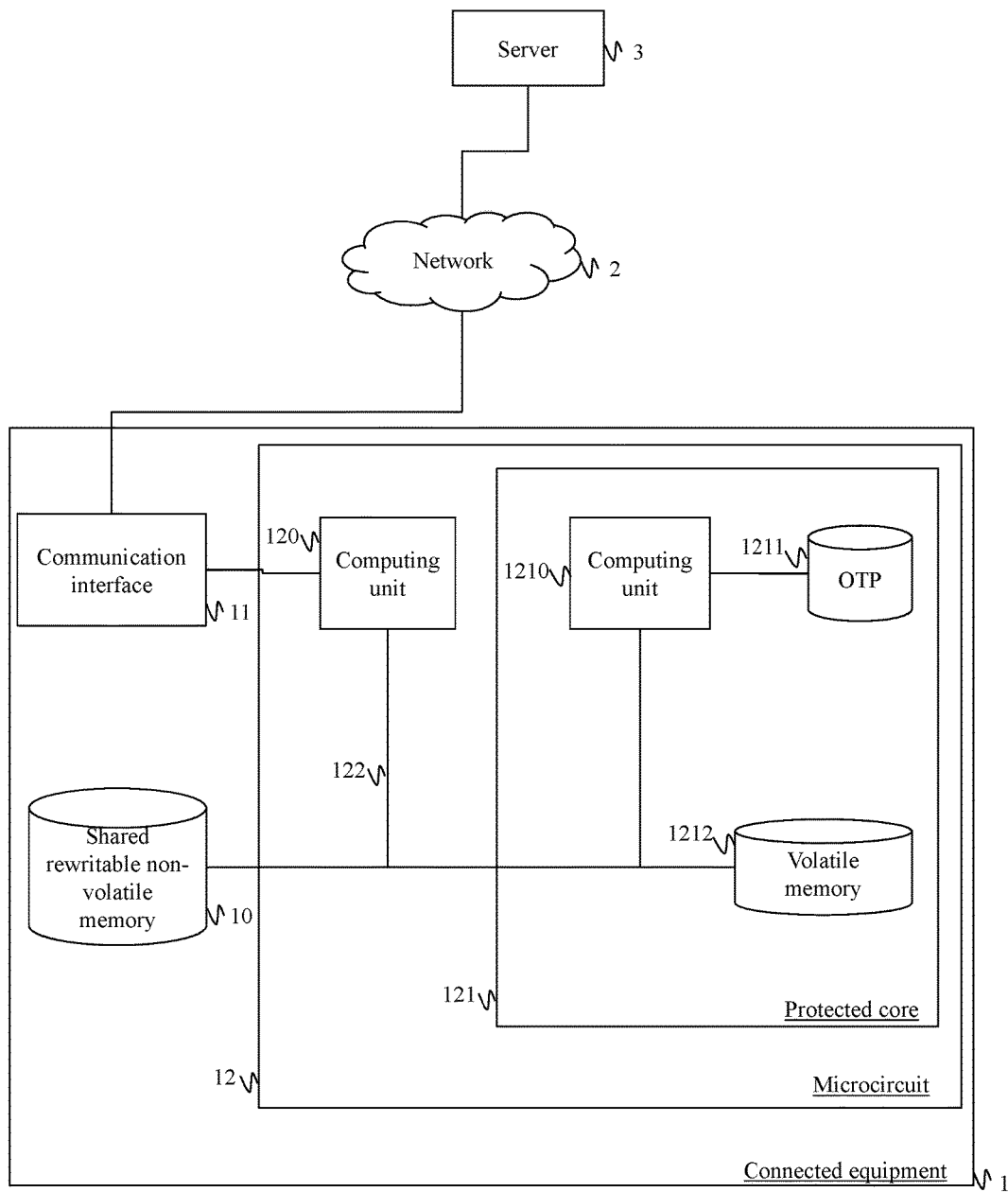
FIG. 1 illustrates schematically a hardware architecture of connected equipment comprising an electronic device able to implement the invention.

FIG. 1 illustrates schematically a hardware architecture of connected equipment comprising an electronic device able to implement the invention.

FIG. 1 shows equipment 1 connected to a server 3 by means of a network 2. The equipment 1 is for example a smartphone. The communication network 2 is for example a 3G or 4G network.

The equipment 1 comprises a rewritable non-volatile memory 10 (denoted RNVM hereinafter) such as for example a EEPROM memory (electronically erasable programmable ROM), a communication interface 11 enabling the connected equipment 1 to connect to the communication network 2 and to communicate with the server 3, and an electronic circuit 12 such as a microcircuit. The electronic circuit 12 comprises, connected by a communication bus 122, a computing unit 120 such as a processor or a microcontroller and an electronic device 121 that may be removable, such as a SIM card. The electronic device 121 performs critical operations and manipulates confidential data. The electronic device 121 is then a subpart of the electronic circuit 12 providing security services. The electronic device 121 is hereinafter referred to as a protected core.

The protected core 121 comprises a computing unit 1210 such as a processor or a microcontroller, a volatile memory 1212 of the RAM (random access memory) type and a single-programming memory 1211 referred to as an OTP memory (one-time programmable) such as a PROM (programmable read-only memory).

The volatile memory 1212 is used for temporarily storing data, such as variables and intermediate computation results. The OTP memory 1211 typically contains instructions causing implementation of the critical operations mentioned above and sensitive data such as encryption keys.

The bus 122 also enables the protected core 121 to communicate with the computing unit 121 and the RNVM 10.

When the connected equipment 1 is powered up (i.e. when the electronic circuit 12 and the protected core 121 are powered up), the computing unit 1210 is capable of executing the instructions stored in the OTP memory 1211.

As can be seen, the protected core 121 does not comprise a rewritable non-volatile memory. It is moreover considered that it is impossible to add more memory to the protected core 121. The protected core 121 could store new sensitive data in the OTP memory 1211 during functioning thereof. However, firstly, the OTP memory 1211 is of limited capacity, and secondly the content of a PROM memory, such as the PROM memory implementing the OTP memory 1211, cannot be altered, that is to say, once written, the data written in PROM memory cannot be modified or deleted. Consequently there is a risk of rapid saturation of the OTP memory 1211. Under these conditions, the protected core 121 uses the RNVM 10 for storing sensitive data.

In one embodiment, the computing unit 1210 of the protected core 121 is a slave of the computing unit of the microcircuit 120. In this way, the protected core 121 can function only under the control of the computing unit 120.

In one embodiment, the computing unit 1210 of the protected core 121 is at least partially autonomous. Thus some operations performed by the protected core can be implemented without interaction with the computing unit 120.

Storage in the RNVM 10 means that the sensitive data must pass over the bus 122. Such a configuration constitutes a security failing that attackers could exploit, even more so since the RNVM 10 may be shared by other devices of the connected equipment 1, such as for example the computing unit 120.

Figure 2:
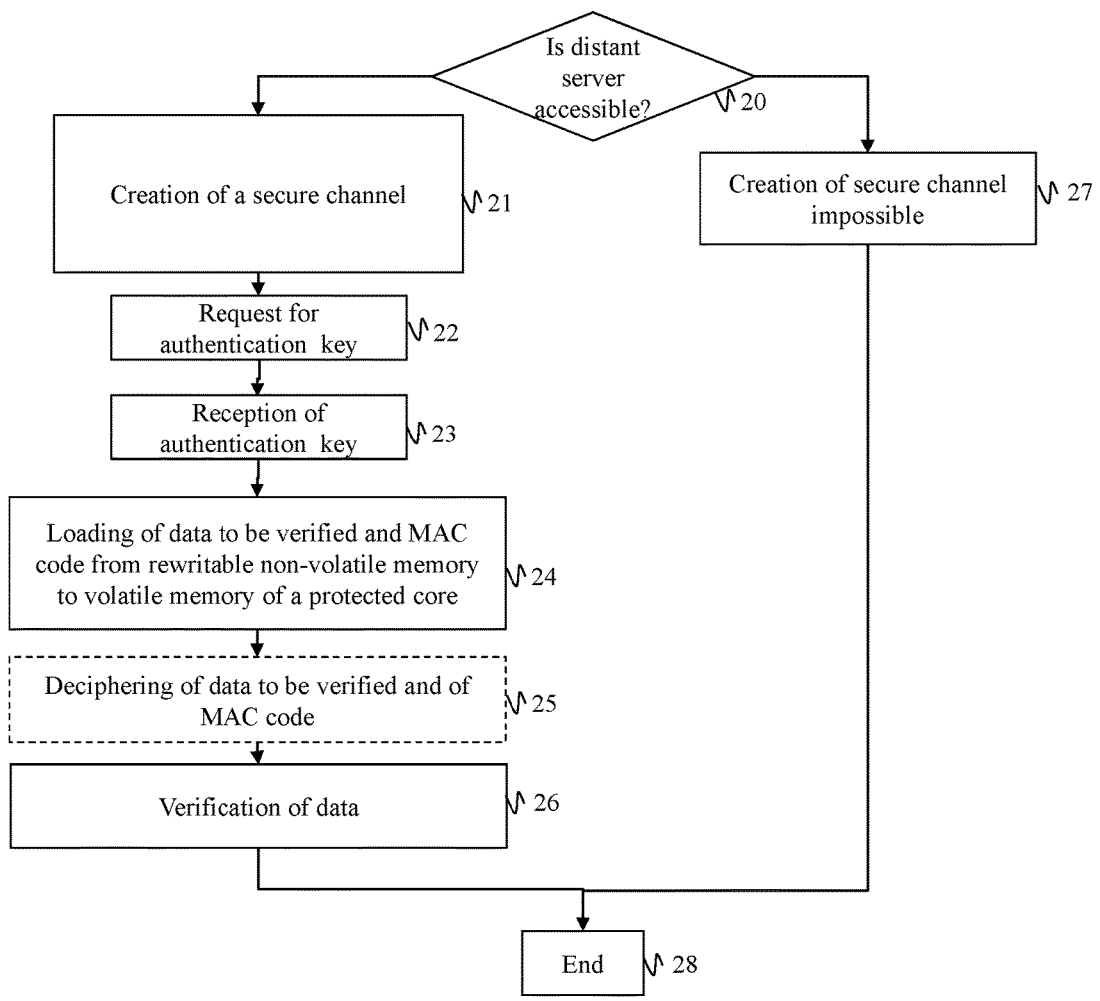
FIG. 2 illustrates schematically an example of a method according to the invention for verifying data of the electronic device.

FIG. 2 illustrates schematically an example of a method according to the invention for verifying data of the electronic device 121.

In one embodiment, the method described in relation to FIG. 2 is implemented when the computing unit 1210 of the protected core 121 must use data that it previously stored in the RNVM 10. It is then necessary to verify these data before use thereof. In this way, the computing unit 1210 of the protected core 121 checks that the data that it needs, stored in the RNVM 10, have not been modified by an attacker.

During a step 20, the computing unit 1210 of the protected core 121 checks that a secured channel can be created between the server 3 and the equipment 1 via the communication network 2. To do this, the computing unit 1210 of the protected core 121 carries out a communication test between the server 3 and the equipment 1. For example, the computing unit 1210 causes a sending by the equipment 1 of a request intended for the server 3. When a response to this request is received by the equipment 1, the computing unit 1210 of the protected core 121 considers that a secured channel can be created between the equipment 1 and the server 3 during a step 21.

If no response to the request is received by the equipment 1, the computing unit 1210 of the protected core considers, during a step 27, that it is not possible to create a secured channel between the equipment 1 and the server 3. In this case, the computing unit 1210 of the protected core 121 does not use data stored in the RNVM 10 that it has not been able to verify. The step 27 is then followed by a step 28, which ends the method.

During step 21, the computing unit 1210 of the protected core 121 creates a secure channel between the equipment 1 and the server 3. To do this, each data item transmitted over the communication network 2 between the equipment 1 and the server 3 is encrypted. An encryption algorithm is then used, such as for example the 3DES algorithm ("Triple Data Encryption Standard (3DES)", RFC 1851, https://tools.ietf.org/html/rfc1851) or the AES algorithm ("Advanced Encryption Standard", RFC 3565, https://tools.ietf.org/html/rfc3565). This encryption algorithm uses a first unique encryption key stored in the OTP memory 1211. As from the step 21 and as far as the end of the implementation of the method described in relation to FIG. 2, each communication between the equipment 1 and the server 3 is protected.

In a step 22, the computing unit 1210 of the protected core 121 causes a sending by the equipment 1 of a request to obtain a key of a message authentication code, referred to as the authentication key, from the server 3. A message authentication code (MAC), which will be referred to as a MAC code hereinafter, is obtained by applying a cryptographic hash function to data in combination with an authentication key. A MAC code allows to simultaneously verify data in terms of integrity and authenticity.

In a step 23, in response to the request sent during step 22, the computing unit 1210 of the protected core 121 receives a request from the server 3 comprising the authentication key requested.

In a step 24, the computing unit 1210 of the protected core 121 loads data to be verified and an MAC code corresponding to said data of the RNVM memory 10 to the volatile memory 1212. As explained hereinafter in relation to FIG. 3, the MAC code was obtained by the protected core 121 from the authentication key and data to be verified prior to the storage of the data to be verified and of the MAC code in the RNVM memory 10. However, for reasons of security, the authentication key was not stored by the protected core 121 after the MAC code was generated. In this way, the protected core has available the authentication key only at the time of the generation of the MAC code, which prevents any attempt at recovery of the authentication key at the protected core.

In a step 26, the computing unit 1210 of the protected core 121 verifies the data to be verified using the secret key and the MAC code loaded from the RNVM memory 10. The MAC code loaded from the RNVM memory is referred to as the first MAC code. To do this, the computing unit 1210 of the protected core 121 applies the cryptographic hash function used for calculating the first MAC code in combination with the authentication key to the data to be verified. The computing unit 1210 of the protected core 121 then obtains a new MAC code, referred to as the second MAC code. It next compares the first and second MAC codes. When the first and second MAC codes are identical, the verification is positive. When the verification is positive, the computing unit 1210 of the protected core 121 can use the data thus verified. Otherwise the computing unit 1210 of the protected core 121 refrains from using these data.

Step 26 is followed by a step 28 that ends the method.

In one embodiment, all the data and the MAC code corresponding to these data stored by the computing unit 1210 of the protected core 121 in the RNVM memory 10 are encrypted by an encryption algorithm. In this way, each transfer of data between the protected core 121 and the RNVM memory 10 is protected. The encryption algorithm applied to the data and the MAC code stored in the RNVM memory 10 may be the same as the one used for creating the secured channel. This encryption algorithm does however use a second unique encryption key stored in the OTP memory 1211. In this embodiment, the method described in relation to FIG. 2 comprises a step 25, intermediate between step 24 and step 26, during which the computing unit 1210 of the protected core 121 deciphers the data to be verified and the MAC code loaded in the volatile memory 1212.

In one embodiment, the method described in relation to FIG. 2 is implemented regularly, for example according to a predefined period, by the computing unit 1210 of the protected core 121. In this way, the computing unit 1210 of the protected core 121 regularly verifies the data that it has stored in the RNVM memory 10 instead of verifying them only when it needs to.

In one embodiment, when the protected core 121 is initiated, the RNVM memory 10 comprises sensitive data, these sensitive data not having been supplied by the computing unit 1210 of the protected core 121 to the RNVM memory 10, but introduced into the RNVM memory 10 when the equipment 1 was manufactured. These sensitive data are associated with an MAC code generated using an authentication key, referred to as the initial authentication key. To enable the computing unit 1210 of the protected core 121 to verify these data, the server knows this initial authentication key and supplies it to the computing unit 1210 of the protected core 121 on request.

In one embodiment, the first and second encryption keys were introduced into the OTP memory 1211 when the protected core was manufactured.

Figure 3:
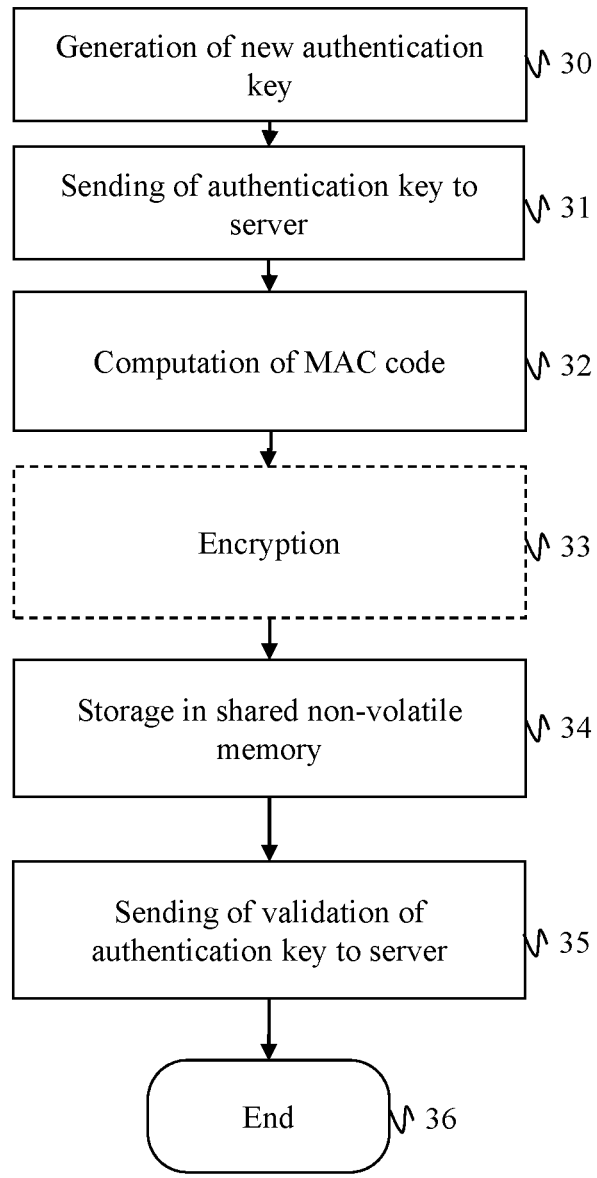
FIG. 3 illustrates schematically an example of a method according to the invention for invalidating old data of the electronic device.

FIG. 3 illustrates schematically an example of a method according to the invention for invalidating old data of the electronic device.

One objective of the method described in relation to FIG. 3 is to prevent any replay attack. Thus, each time new data are stored by the computing unit 1210 of the protected core 121 in the RNVM memory 10, the MAC code associated with all the data stored by the computing unit 1210 of the protected core 121 in the RNVM memory 10 are modified. In this way, an attacker succeeding in copying data previously stored in the RNVM memory 10 could not reuse them since they would not be associated with their correct MAC code.

The method described in relation to FIG. 3 is therefore implemented whenever the computing unit 1210 of the protected core 121 must store new data in the RNVM memory 10.

In a step 30, the computing unit 1210 of the protected core 121 generates a new authentication key different from the previous keys. The computing unit 1210 of the protected core 121 for example applies for this purpose the NIST recommendation SP 800-90A "Recommendation for Random Number Generation Using Deterministic Random Bit Generators"). This authentication key is stored temporarily in the volatile memory 1212. As during steps 20 and 21, the computing unit 1210 of the protected core 121 checks that a secured channel can be created between the equipment 1 and the server 3 and, when this is possible, creates such a secured channel. Each exchange of data between the computing unit 1210 of the protected core 121 and the server 3 in the context of the method described in relation to FIG. 3 then uses the secured channel. If the secured channel cannot be created, the computing unit 1210 of the protected core 121 waits until it can create such a channel before being able to continue the method with a step 31.

During step 31, the computing unit 1210 of the protected core 121 causes a sending by the equipment 1 of the authentication key to the server 3. When the server 3 receives the authentication key, it stores this authentication key until this key is replaced by another authentication key.

During a step 32, the computing unit 1210 of the protected core 121 calculates an MAC code for all the data stored in the RNVM memory using the authentication key generated during step 30. All the data comprise data previously stored by the computing unit 1210 of the protected core 121 in the RNVM memory 10 and the new data.

In a step 34, the computing unit 1210 of the protected core 121 stores all the data and the MAC code calculated from these data and from the authentication key in the RNVM memory 10.

During a step 35, the computing unit 1210 of the protected core 121 sends a request to the server 3 in order to validate the authentication key received in step 31.

Steps 34 and 36 are performed as a transaction in order to guarantee atomicity.

These steps may be interrupted for example by a power cut. If these steps are interrupted, the previous data, encrypted with the old key, are restored.

Step 35 is followed by a step 36 during which the computing unit 1210 of the protected core 121 ends the method.

During step 36, the computing unit 1210 of the protected core 121 deletes the authentication key from the volatile memory 1212. Since the authentication key is no longer available on the equipment 1, it can no longer be recovered fraudulently by an attacker, which further limits the possibilities of replay attack.

As seen above, in one embodiment, the data and MAC code intended to be stored by the computing unit 1210 of the protected core 121 in the RNVM memory 10 are encrypted. In this case, the method described in relation to FIG. 3 comprises a step 33 of intermediate encryption between step 32 and step 34. During this step, all the data and the MAC code are encrypted by the computing unit 1210 of the protected core 121.

In the method described in relation to FIG. 3, we described that a different new authentication key was generated by the computing unit 1210 of the protected core 121 whenever the computing unit 1210 of the protected core 121 must store new data in the RNVM memory 10. In one embodiment, the computing unit 1210 of the protected core 121 does not generate a new authentication key whenever the computing unit 1210 of the protected core 121 must store new data in the RNVM memory 10, but either at predefined regular time intervals or following a predefined number of new data storages in the RNVM memory 10. In another embodiment, the computing unit 1210 of the protected core 121 generates a new authentication key at instants determined randomly by the computing unit 1210 of the protected core 121. Following the generation thereof, the authentication key that is generated is transmitted to the server 3. When the authentication key is first used, steps 30 to 36 are implemented by the computing unit of the protected core. However, since during step 36 the computing unit 1210 of the protected core 121 deletes the authentication key from the volatile memory 1212, the computing unit 1210 of the protected core 121 no longer has this authentication key available for any reuse. In this case, when the computing unit 1210 of the protected core 121 wishes to reuse a key already used previously, it re-requests the last authentication key generated of the server 3. The server 3 then sends this authentication key using a secured channel. When there is reuse of an authentication key already used for storing data in the RNVM memory 10, the computing unit 1210 of the protected core 121 does not implement steps 30 and 31 of the method described in relation to FIG. 3. After having received the last authenticated key generated from the server 3, the computing unit 1210 of the protected core 121 implements steps 32 to 36. Moreover, in these embodiments, although the authentication key is not changed whenever there is a storage of data in the RNVM memory 10, the probability of a replay attack succeeding remains low.

In one embodiment, the authentication key is generated not by the computing unit 1210 of the protected core 121 but by the server 3. To do this, whenever the computing unit 1210 of the protected core 121 must store data in the RNVM memory 10, it causes the sending by the equipment 1 of a request aimed at obtaining an authentication key from the server 3. There also, the server 3 cannot generate a new authentication key for each storage of data in the RNVM memory 10. Thus the protected core 121 does not have an algorithm making it possible to generate an authentication key, which reinforces security against attacks. There also, the protected core 121 does not store the authentication key and has available the authentication key only at the moment of the generation of the MAC code, which prevents any attempt at recovery of the authentication key at the protected core 121.

The invention claimed is:

1. A method for verifying data generated by an electronic device included in equipment suitable for communicating with a server via a communication network, the electronic device comprising a computing unit, a non-volatile one-time programmable memory and a volatile memory, the equipment comprising a rewritable non-volatile memory and a communication bus enabling the electronic device to store data in the rewritable non-volatile memory, wherein the method is implemented by the electronic device and comprises:

creating a secured channel by encryption between the equipment and the server;

obtaining a message authentication code key, referred to as an authentication key, from the server;

loading data to be verified and a message authentication code corresponding to said data from the rewritable non-volatile memory to the volatile memory, the message authentication code having been obtained by the electronic device from the authentication key and said data prior to the storage of said data and message authentication code in the rewritable non-volatile memory, the electronic device having had available the authentication key only at a time of generation of the message authentication code;

verifying the data to be verified using the authentication key and the message authentication code and allowing use of the data when the verification is positive, but disallowing use of the data when the verification is negative so that no data stored in the rewritable non-volatile memory can be used if the data has not been verified positively by means of the authentication key and the message authentication code, which limits the possibilities of replay attack.

2. The method according to claim 1, wherein the data to be verified and the message authentication code have been encrypted using a first encryption key stored in the one-time programmable memory prior to storage thereof in the rewritable non-volatile memory and are deciphered following loading thereof in the volatile memory and prior to verification thereof.

3. The method according to claim 1, wherein the data to be verified are used only when the secured channel between the equipment and the server can be created.

4. The method according to claim 1, wherein the encryption used for creating the secured channel uses a second encryption key stored in the one-time programmable memory.

5. The method according to claim 1, wherein the authentication key is obtained by the electronic device following a transmission by the electronic device of a request to obtain said authentication key from the server.

6. The method according to claim 1, wherein the authentication key was previously generated by the electronic device and transmitted to the server.

7. The method according to claim 1, wherein the authentication key was previously generated by the server and transmitted to the electronic device for generating security information.

8. The method according to claim 1, wherein a different new authentication key is generated whenever data are stored by the electronic device in the rewritable non-volatile memory or at predefined regular time intervals or following a predefined number of storages of data in the rewritable non-volatile memory or at randomly determined instants.

9. An electronic device comprising circuitry adapted for implementing the method according to claim 1.

10. Equipment able to communicate with a server via a communication network comprising a rewritable non-volatile memory and an electronic device according to claim 9.

11. A system comprising a server and equipment according to claim 10, the equipment being adapted for communicating with the server via a communication network.

12. A non-transitory information storage medium, storing a computer program comprising instructions for the implementation, by a device, of the method according to claim 1, when said program is executed by a computing unit of said device.

* * * * *